Oct. 10, 1967  M. M. STERNAU  3,345,798
METHOD AND APPARATUS FOR MAKING AND APPLYING CLOSURES
Filed March 26, 1962  8 Sheets-Sheet 1
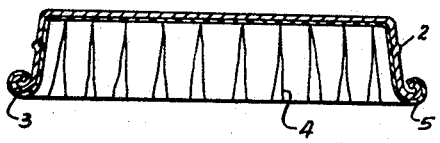
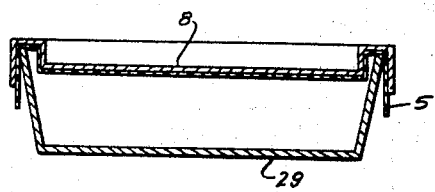
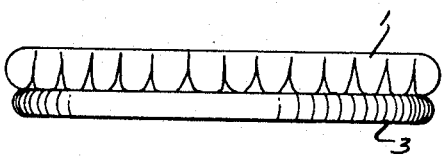
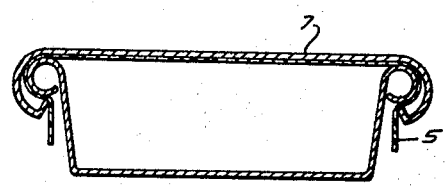
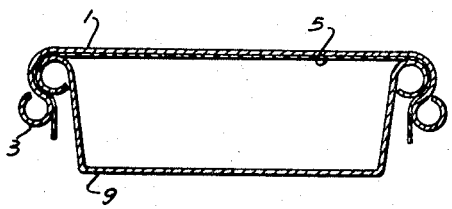
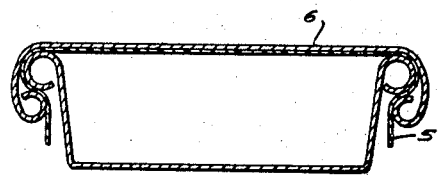
INVENTOR.
MARTIN M. STERNAU
BY *James M. Heitman*
ATTORNEY Oct. 10, 1967 M. M. STERNAU 3,345,798
METHOD AND APPARATUS FOR MAKING AND APPLYING CLOSURES
Filed March 26, 1962 8 Sheets-Sheet 2

INVENTOR.
MARTIN M. STERNAU
BY *James M. Heitman*
ATTORNEY

Oct. 10, 1967  M. M. STERNAU  3,345,798
METHOD AND APPARATUS FOR MAKING AND APPLYING CLOSURES
Filed March 26, 1962  8 Sheets-Sheet 4
FIG. 13
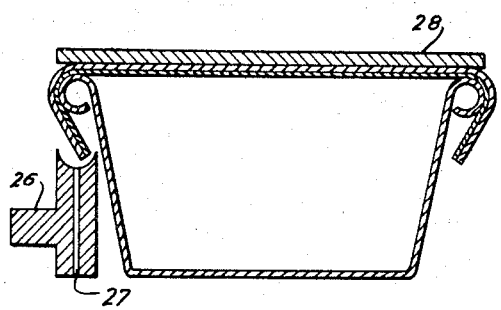
FIG. 14
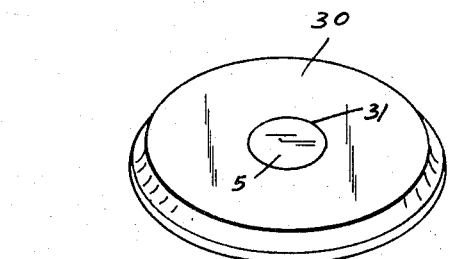
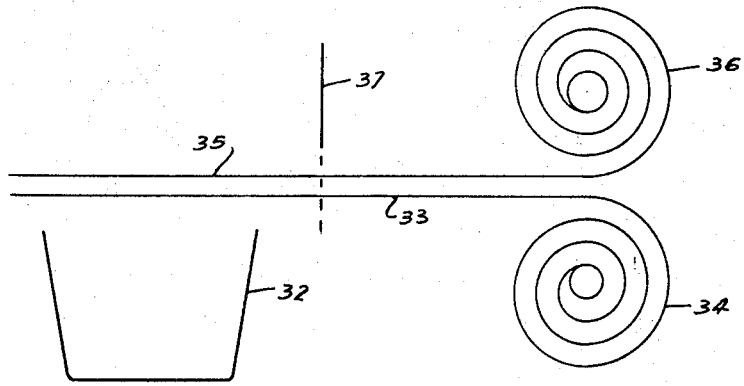
FIG. 15
INVENTOR.
MARTIN M. STERNAU
BY James M. Heilman
ATTORNEY Oct. 10, 1967   M. M. STERNAU   3,345,798
METHOD AND APPARATUS FOR MAKING AND APPLYING CLOSURES
Filed March 26, 1962   8 Sheets-Sheet 5

INVENTOR.
MARTIN M. STERNAU
BY *James M. Heitman*
ATTORNEY

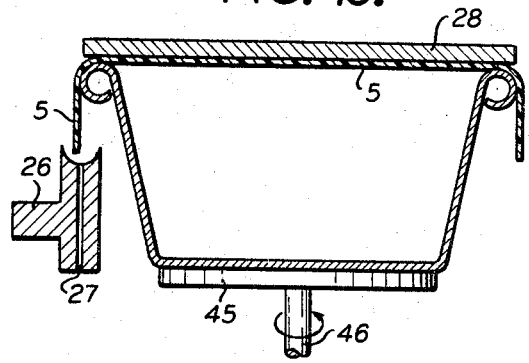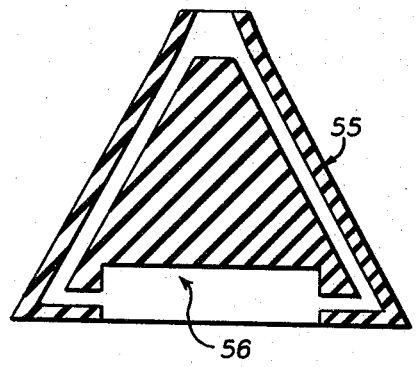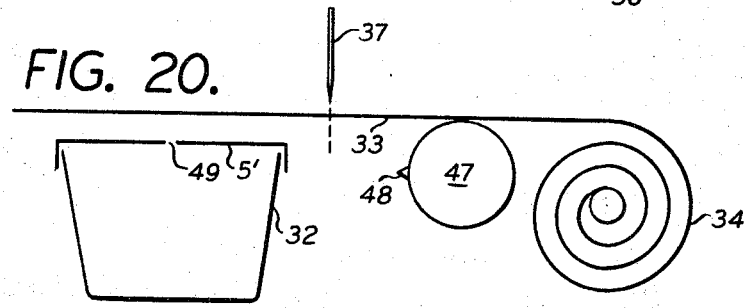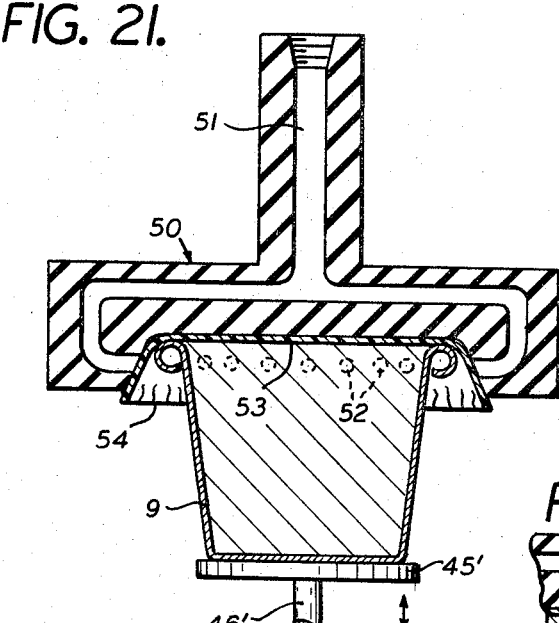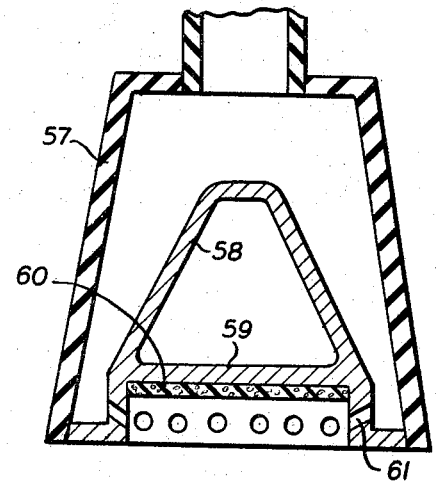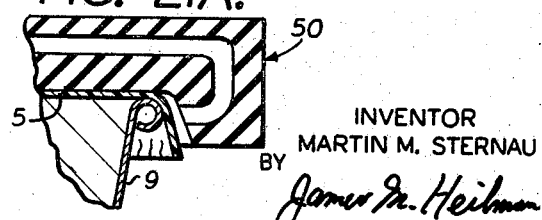

Oct. 10, 1967   M. M. STERNAU   3,345,798
METHOD AND APPARATUS FOR MAKING AND APPLYING CLOSURES
Filed March 26, 1962   8 Sheets-Sheet 8

INVENTOR
MARTIN M. STERNAU
BY
ATTORNEY.

United States Patent Office 3,345,798
Patented Oct. 10, 1967

3,345,798
METHOD AND APPARATUS FOR MAKING
AND APPLYING CLOSURES
Martin M. Sternau, Flushing, N.Y., assignor, by mesne
assignments, to W. R. Grace & Co., Duncan, S.C., a
corporation of Connecticut
Filed Mar. 26, 1962, Ser. No. 182,505
5 Claims. (Cl. 53—41)

One of the objects of my invention is to provide a closure, which is an inexpensive, simple hermetic seal for a container irrespective of whether the container is made of paper, plastic, aluminum, steel, etc. This application is a continuation-in-part of applications Ser. No. 591,628, filed June 15, 1956 and Ser. No. 653,227, filed Apr. 16, 1957 and now abandoned.

Another object of my invention is to provide a hermetic seal for a container irrespective of whether the container is made of paper, plastic, glass, aluminum, steel, etc., and to provide the apparatuses, methods, processes and techniques therefor.

Another object of my invention is to provide an outside or an inside closure formed from a transparent, heat shrinkable, oriented plastic sheet alone, or from two dissimilar materials, the inner component being formed of a limp film of a fragile, transparent, thin, flexible, unformed, heat shrinkable, oriented plastic film of any type and the outer component being formed of a semi-rigid, moldable material, i.e., a one-part, a two-part, or a two-ply closure.

Another object of my invention is to provide a sealing closure that will permit removal and replacement of the outer cover whereby inspection of the contents of the container may be made without breaking the seal of the inner component, thereby eliminating the danger of contamination.

Another object of my invention is to provide a two-part or three-part closure comprising an inner stiffening component and an outer sealing closure with or without a further protective covering for the sealing closure.

Another object of my invention is to provide a dome-shaped cover with a gathered skirt and elastic edge for use as either a shower cap or a replaceable closure which will enclose the rim of the container in a sanitary manner.

Another object of my invention is to provide a closure which will reduce the cost of manufacture of the container by reducing the amount of container material required.

Another object of my invention is to provide a closure which will accept, respond, and reshape itself to conform to deforming forces upon the container, closure, or upon both, without damage to, or loss of seal, originally obtained.

Another object of my invention is to provide a closure which will deform due to reduced or increased pressures without damage to or loss of seal thereby reducing the hazard of deformation or breakage of the container due to said varied pressures.

Another object of my invention is to provide a closure which will materially strengthen the container upon which the closure is sealed to resist deformation and withstand shock.

One of the aspects of this invention is a closure made of flexible and moldable material, and particularly a closure having a beaded and expansible rim.

One of the objects of my invevntion is to make an improved closure, with or without an inside cover of plastic material, in which the rim is pleated before being formed or rolled in such a manner that expansion and contraction at the rim area may occur to receive and to hold the slightly larger bead on the mouth of a container by locking the rim of the closure below the bead of the container.

Another object of my invention is to provide a method and apparatus for forming the cover and for positioning the cover on a container.

Another object of my invention is to provide a method of holding or retaining transparent, oriented plastic sheet material during conversion into a hermetic sealing cover on a container.

Another object of my invention is to provide a method of sealing a plastic sheet closure on a container.

Another object of my invention is to provide a method of manufacturing a hermetically sealing cover from basic raw sheet materials directly upon the container upon which it shall be used and at the time of closure of the container, using the container as the male forming component of the closure.

Another object of my invention is to provide a heat sealing closure for a container.

Another object of my invention is to provide a construction of materials which includes a shrinkable film that may be manufactured into a hermetic closure prior to or during application on the container.

A still further object of my invention is to provide a cord to tear open either the plastic film or both covers when a two part closure is used.

A still further object of my invention is to provide additional sealing means in case additional sealing insurance is desirable.

With the foregoing and other objects in view as will appear from a reading of the following specification and claims, the invention resides in the novel arrangement and combination of parts and in the details of construction and process of manufacture hereinafter described and claimed, it being understood that changes in the precise enbodiment of the invention may be made within the scope of what is claimed without departing from the spirit of the invention. It will be further understood that the invention is susceptible of embodiment in many and various forms, some of which are illustrated in the accompanying drawing, and that the structural details or particular steps of the method herein set forth may be varied to suit particular purposes and still remain within the inventive concept.

Referring briefly to the figures:

FIG. 1 illustrates a 2-ply closure in a vertical sectional view;

FIG. 2 shows a 2-ply closure according to the invention ready for use;

FIGS. 3, 4, 5 and 6 show various types of protective covers which shield the inside sealing cover on different type containers;

FIG. 13 shows a different type apparatus for applying heat to the closure to shrink the inner layer of the closure after crimping;

FIG. 14 illustrates a 2-ply closure with an inspection hole in the outer layer;

FIG. 15 illustrates a straight sided container having a plain, unrolled edge being covered with a modified 2-part closure formed from two rolls of materials;

FIG. 19 shows a view similar to FIG. 13, but with a single-ply plastic closure and with means for rotating the film relative to the source of heat.

FIG. 20 illustrates a view similar to FIG. 15, but with only a single roll of preferably plastic film. However, the single roll might be a laminated material of various suitable types.

FIG. 21 shows a single-ply closure 53 somewhat slightly thicker and slightly stiffer than the usual preferred film so that it will abut against the sides of the sealing tool 50 as it is positioned against the diaphragm at the upper end of the cavity 54.

FIG. 21a is a cross-sectional view showing the preferred limp, drapable film in the same type of sealing tool in which the sides of the film do not touch or substantially do not touch the side walls of the cavity.

FIGS. 22 and 23 show modified forms of cone-shaped, truncated cone, or frusto-conical heating tools made of non-heat-conducting materials, such as, asbestos, hard rubber, etc.

Figure 24:
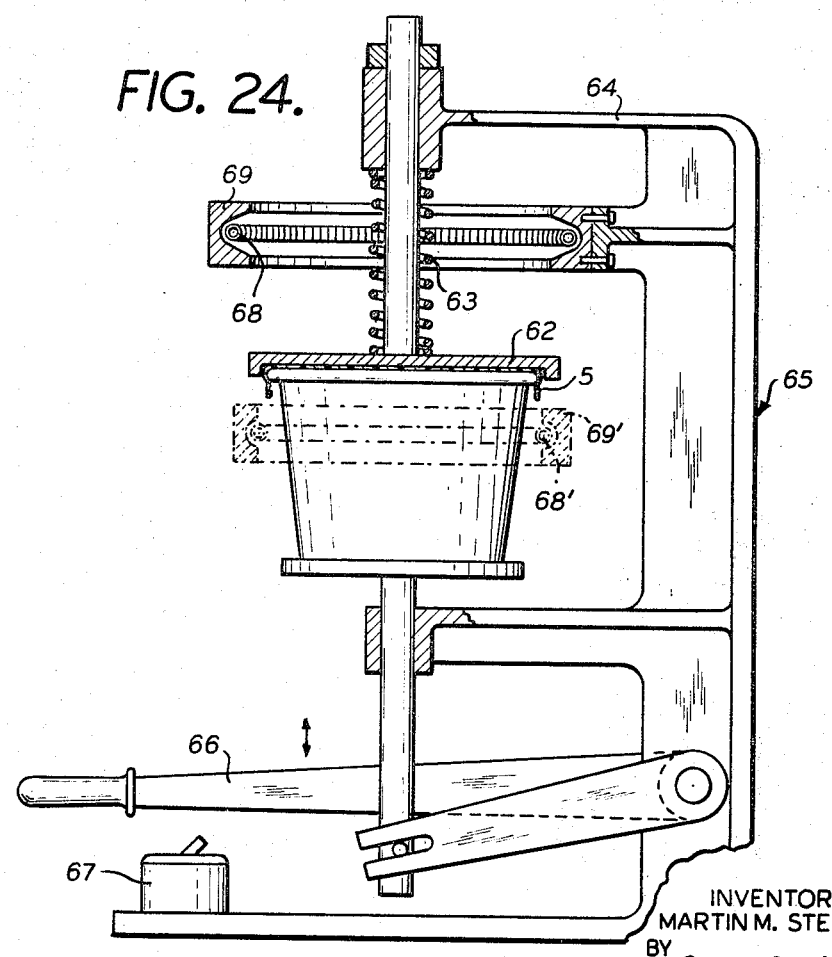

FIG. 24 illustrates an apparatus for applying a single-ply closure by electrical heating elements. Element 68 operates by supplying convection and radiant heat. If desired, the heated wire 68' might be applied to the plastic cover by means of actual contact, as alternatively indicated in phantom below the retaining shield 62.

Figure 25:
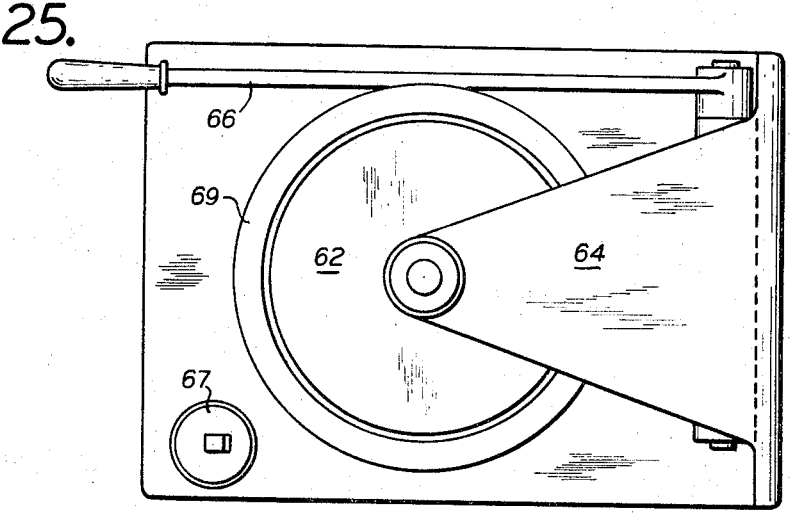

FIG. 25 is a top plan view of FIG. 24.

Figure 26:
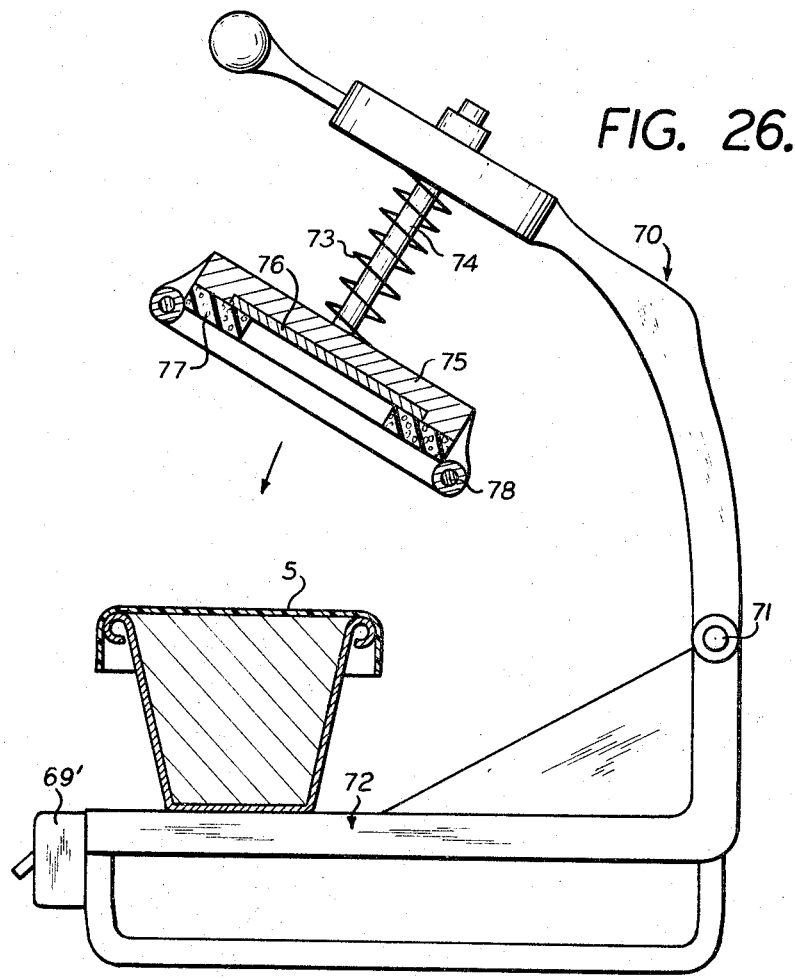

FIG. 26 shows a modified sealing head which is pivoted.

Figure 27:
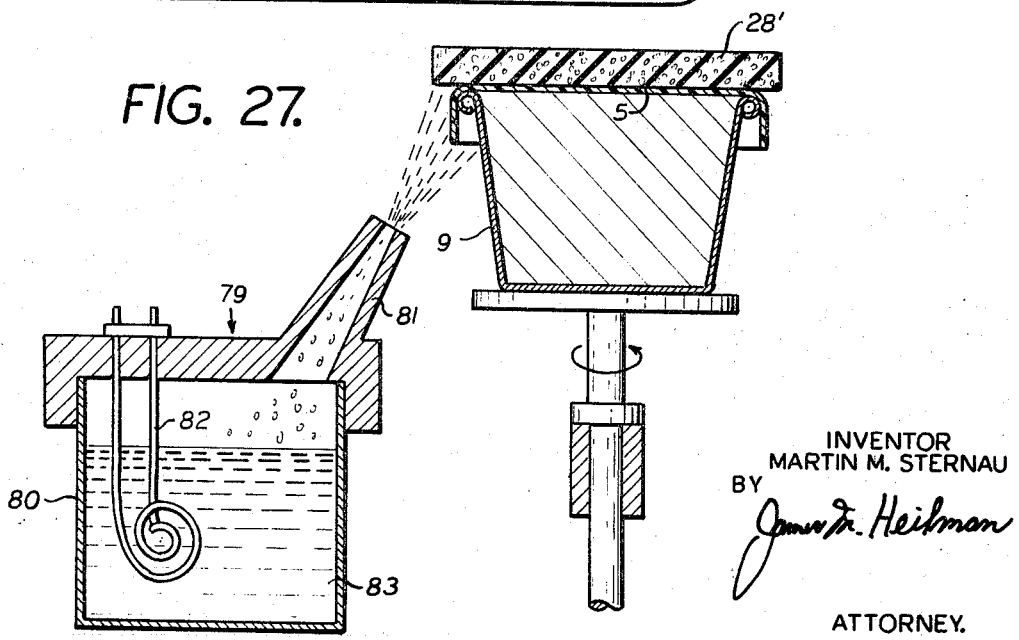

FIG. 27 shows a further modified form of FIG. 13 in which steam provides the fluid heating medium rather than heated air or a heated oven.

While certain aspects of the invention, i.e., the elastic plastic cover, may be first used as a new replaceable cover for containers when the usual original metal or rigid plastic covers are destroyed, or for any other purposes for which a plastic dome-shaped cap may be used, such as, a shower cap, refrigerator dish cap, etc., this invention is primarily a closure for a receptacle. The closure consists of a combination, laminated or otherwise physically held in approximately uniform parallel position, of an inner or underside cover of a shrinkable and clear, translucent, or opaque, film or sheet of various materials, and an outer cover of a moldable, rigid, or semirigid, and clear, translucent, or opaque material, such as aluminum, paper, plastic, glass, steel, etc., or combinations thereof. The inner cover is to provide a seal for the container on which the closure is used, and the outer cover is to provide a mold or retaining device or shield for the former during the sealing operation, and to provide an ultimate protecting cover for the inner cover and for the container upon which this closure is used.

As one example, the outer cover of the closure possesses a peripheral flange formed prior to, or during, the operation affixing the closure cover or covers to the container and having applied at its outer rim or edge means wherein both components of the closure are rolled, curled, bent or otherwise temporarily or permanently held together so that the inner component of the closure is held or retained by or within the rim of the outer component. The securing together of the two covers or components is done prior to, during, or after the sealing operation. There are any number of possibilities by which a closure as outlined above may be put into a practical form, for instance:

(1) A closure may be made as shown in FIG. 2 comprising plies of dissimilar materials, the inner layer consisting of a transparent film shrinkable under heat application, the outer layer made of aluminum sheet or any other moldable material. Both components are formed into a cover having, as one example, a circular top portion and an integral peripheral flange and a beaded rim. If this type closure is snapped onto a container with a beaded or a plain edge, the bead of the closure will be locked circumferentially below the rim of the container. When heat is applied to the rim of the closure or to the container, or to the covered container, the following takes place:

(a) The film will primarily shrink a maximum distance circumferentially around the rim of the container due to more rapid heat absorption of the exposed, uncovered, or unshielded film at this general area, with the result that:

(b) It will pull the beaded rim of the outer layer of the closure tighter around the circumference below the bead of the container. This occurs because both elements are engaged at the rim area thereby making the outer cover tighter on the container.

(c) The shrunken film at the rim will conform to the shape and irregularities of the container rim creating an additional seal around the rim of the container.

(d) Due to this primary local shrinkage around the rim, lip, or edge of the container, the entire inner component is fastened or anchored at the rim, lip, or edge, and the remainder of the film is pulled tightly across the mouth of the container, creating a closure which, being so created, is in constant tension, said tension thereby further tightening and improving the seal at the edge of the container and said tension further strengthening the container against deformation by pulling equally at all points at the container edges towards the center of the closure. This tension in the film is further increased by any secondary heat absorption in the portion of the film covering the mouth of the container, still further improving the seal at the mouth of the container.

(e) A properly selected wax, heat sensitive cement or heat softening material can be applied to the cover near its rim or to the rim of the container before attaching the cover. When heat is applied, this wax will melt simultaneously with the shrinking of the film, the film enveloping the rim of the container, and the melting wax, etc. being drawn by capillary action into any surface irregularities at the rim of the container and therewith form or assist in forming a leakproof seal.

Similarly, the above function takes place with different type closures used on different type containers, and for specialized contents. For example, in sealing the closure on containers containing frozen foods, the seal may be made by passing the closed container through a heated oven. The system being at a lower temperature, a greater amount of time or heat will be required to reach the shrinkage temperature of the film. That area capable of most rapid heat absorption and therefore that area where shrinkage conditions will first be reached is the rim circumference of the closure since at this point the film is relatively exposed and not shielded. In passing through an ambient hot air oven, this exposed rim portion of the film will require less time to reach shrinkage temperatures, thereby permitting the seal to be made at the rim of the container, which may or may not be followed by tightening of the film across the entire mouth of the container. To create a closure in further tension, additional film tightening is accomplished by additional heat application over the entire area of the cover or film. This additional heat application may be accomplished by an increase in temperature or an increase in time.

(2) A cover may be made as shown in FIG. 1, for example. This cover has a peripheral crease to facilitate the formation of a peripheral bulge (FIG. 2) before the closure is snapped onto the container. A closure as shown in FIG. 1 has the advantage of economical space saving stacking for packaging.

(3) A closure may be made using an outer single-ply cover of aluminum, or paper, etc. as a retainer or shield or both for a shrinkable plastic sheet, said sheet being larger than the mouth of the container. The plastic sheet is placed on top of the container, and the cover snapped onto the container. This will create the essential condition that the film is held substantially flat across the mouth of the container, while the edge of the film is arranged around the rim of the container in pleats protruding beyond the outer cover. When heat is applied to the rim of the container the protruding film will shrink and will conform to the shape of the rim of the container. Hence, a tight seal is formed around said rim, while the remainder of the film is pulled tightly across the mouth of the container. If additional heat is subsequently applied over the entire area of the closure, further tightening of the seal will result. This method has the advantage that the outer cover can be removed without disturbing the seal of the film portion of the closure. This process has the additional advantage that the outer cover can be repeatedly taken off and snapped back onto the container without losing its original efficiency of snapping onto the container, and locking below its rim due to its expandable pleated rim. Furthermore, the outer cover may be used to recap the container after part of the contents have been removed.

(4) A closure may be made as shown generally in FIG. 1 or FIG. 2 but with the outer cover 30 having a hole 31 in the center for visual inspection through the transparent inner cover 5 without removing the cover or breaking the seal, all as shown specifically in FIG. 14.

Figure 16:
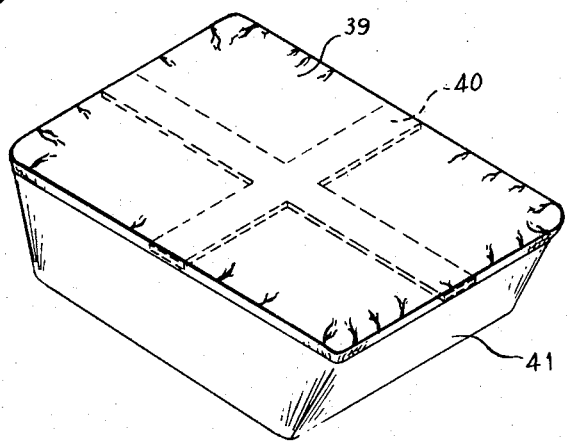
FIG. 16 is a perspective view of a modified form of my closure wherein a stiffening element is used to reinforce the rim of the container as well as the plastic cover.
Figure 17:
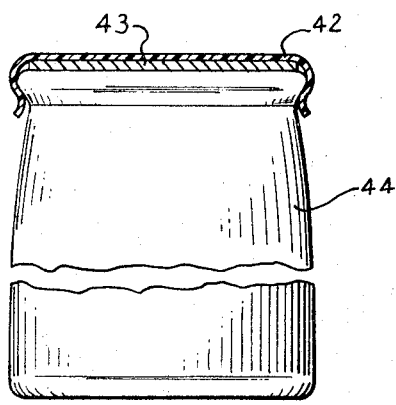
FIG. 17 illustrates a similar construction in which the reinforcing element rests on the rim of the container.

(5) A closure may be made as shown in FIGS. 16 and 17. In this modification, the heat shrinkable cover may be provided with a secondary inner layer, consisting of a moldable or rigid material, such as cardboard or plastic, suitably attached to the heat shrinkable film. This inner layer is designed to fit inside the container rim as, for example, in FIG. 16, so that, when heat is absorbed during sealing, the closure will shrink around the rim of the container as described in paragraph 3 above, to form a sealing closure, The cardboard, plastic, etc. will act as a stiffener or brace for both closure and container. This is of advantage in particular on oblong containers, where the long side of the container rim or side may tend to buckle under the tension of the shrinking film, in which case the stiffener will prevent this from happening. Also, the reenforcement may lie over the rim of the container as in FIG. 17, in which case it will stiffen only the plastic cover and not the container proper. This stiffener may be shaped in the form of a single rib, cross, disc, or any other suitable configuration. Obviously, an outer protective cover may also be used if desired.

(6) A closure may be made by using a shrinkable film in combination with a two ply moldable material, such as aluminum foil laminated with paper, as it is used for example on milk bottle tops. If such a three ply closure is placed, for example, over the top of a milk bottle, with the heat shrinkable film on top of the outside of the 2-ply material (or on the inside if the entire combination is laminated together) and retained while heat is applied at the rim of the container, the film protruding beyond the moldable material will shrink around the rim of the milk bottle, which will result in a crimped cap on the bottle.

Figure 10:
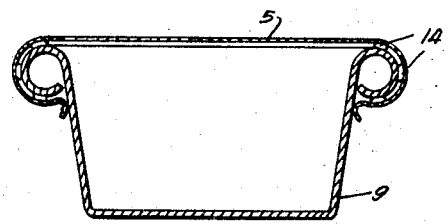
FIG. 10 shows additional sealing cement, or wax, beneath the sealing cover.
Figure 9:
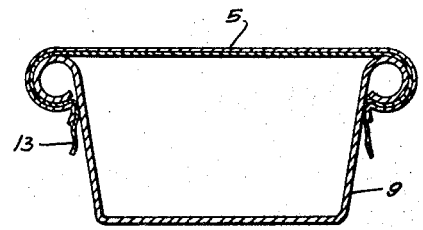
FIG. 9 shows a single cover which has an opening string beneath it.

It is not necessary, but if desired, as shown in FIG. 10, a wax, or cement, or some other sealing medium 14 may be applied to the cover or to the container prior to or during the sealing operation, and said materal will adhere to the shrinking or shrunken film during the heat sealing operation and thereby provide double protection against leakage. Also, any of the covers may have incorporated a means of tearing, or otherwise removing said sealed film cover by means of a string, band, etc. 13 by having this device incorporated into the cover construction prior to or during the sealing operation as shown in FIG. 9.

Since the rim of the plastic film portion is generally rolled into the rim of the aluminum portion of the closure, it is locked and retained by the aluminum portion of the cover. Or, if preferred, additionally or alternatively, the film may be bounded or glued to the aluminum peripherally at the rim. Consequently, when this cover is snapped on an aluminum container, and heat is applied to effect selective shrinkage of the cover, the plastic film portion will primarily shrink a maximum amount circumferentially around the rim of the container due to the cover design. Thus it will take the shape and configuration of the rim of the circular, rectangular, or other shape of the container, and create therewith a leakproof seal around the rim.

It is a novel feature of this invention to place a sheet of shrinkable, oriented plastic film on top of a paper, plastic, aluminum sheet or foil container and to retain and shield it by means of any outer cover and, by subjecting it selectively to heat, to shrink it around the mouth of the container thereby forming a leakproof, dome shaped, removable and reappliable cover. Because of the particular design or construction of the closures described above, selective heating causing selective shrinkage is also inherently present when overall heat is applied for the following reasons:

In a closure wherein the heat-shrinkable film protrudes beyond the rim of the container in combination with the retaining and shielding snap-on cover as previously explained, if this cover-film-container system is subjected to overall heat, it is obvious that the protruding unshielded film will be affected by heat application first. This occurs since the protruding edges are the only portion of the film component of the cover which is not shielded from the heat application by the outer component and the container. In consequence thereof this portion will shrink first, i.e., before the rest of the film, which is shielded by the retaining cover and the container, reaches the shrinkage temperature, so that selective shrinkage is affected.

Similarly, selective heating causing selective and controlled shrinkage will result through overall heat application on a two-ply cover, where the film is rolled together with the outer ply at the rim, as shown in FIG. 1. In this type cover that portion of the film which is not shielded, i.e., exposed, and capable of absorbing heat before those portions of the film that are shielded, is located circumferentially below the rim of the container at the area where the seal will occur. As a result for this two-ply closure also selective heating and selective shrinkage are obtained, although overall heat application may be employed. The same holds true to a greater extent, if the contents of the container are frozen, since selective heating by overall heat application and consequently selective shrinkage becomes more pronounced.

A closure may be made containing a heat shrinkable component as heretofore described, which, because of active tension in the shrunken film will accept, respond to, or reshape itself to conform with deformation of the container, closure, or both without damage to or loss of seal originally obtained. Similarly this closure can deform to accommodate reduced or increased pressures within the container-closure system, upon which the closure is used.

Closures embodying a heat shrinkable component as heretofore described will impart added strength and rigidity to the container, closure, and seal by utilizing physical forces that are developed by shrinkage of the film. The film component, upon being tightened during shrinkage, is in a state of tension, in which condition active radial compressive forces are created upon the rim of the container. These compressive forces cause reactive expansive outward forces. A stable equilibrium is established between these forces and in consequence thereof added rigidity is imparted to the closure, the container, and to the seal.

FIG. 1 shows an outside cover similar to the replaceable "shower cap" cover illustrated in my previous invention, Patent No. 2,756,921, granted July 31, 1956 (incorporated by reference herein), upon which this is an improvement. The invention in FIG. 1 is directed to a loose roll or double fold of the rim, whereby the pleated area in the rim is freely able to expand and contract as the elastic edge of the cover is slipped over the mouth of the container. The loose roll of the rim could involve a plurality of complete turns rather than one as shown. Also, a thin plastic film cover may be applied, if desired, alone or in connection with the outer cover.

Numeral 1 represents the rigid cover made of flexible moldable material, such as aluminum, paper or plastic, while 2 indicates the crease formed in the flange of the cover and 3 indicates the loose roll of the elastic rim. Edge 3 may be formed with a double fold rather than a loose roll, the main consideration being that the edge be expansible and lock beneath the edge of the container. Numeral 4 indicates the gathered pleats which are formed in the flange of the cover and 5, if a liner is used, illustrates such elastic pleated liner or inside cover. The outside covers, such as, 1, serve not only to protect the limp, unformed, draping plastic cover, but also, when heat is applied to seal the plastic cover, initially holds down and shields the main portion of the plastic cover while leaving the edges thereof exposed to heat.

Upon the application of pressure before or as the cap is being secured to the container, due to the crease, the bulge will be formed, as clearly illustrated in FIG. 2.

FIGS. 3 to 6 indicate various types of closures, in which numeral 5 illustrates the inside plastic cover with various types of outside protective covers such as cover 1 in FIG. 3; cover 6 in FIG. 4; cover 7 in FIG. 5; and cover 8 with a central depressed portion in FIG. 6. These covers may be placed on dissimilar type containers 9, 29, etc. Clearly, the two covers or the plastic film alone may be laid flat over a straight sided container as shown in FIG. 15.

Figure 7:
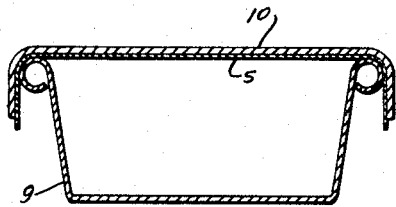
FIGS. 7 and 7A show another type closure before and after beading same together with container.
Figure 7A:
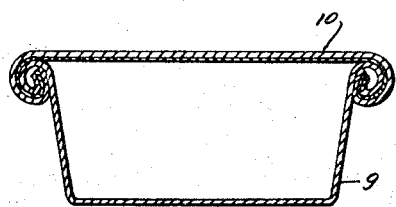

FIGS. 7 and 7A illustrate plastic film cover 5 and protective cover 10 placed over container 9. Subsequently these covers are crimped around to make a tight closure, as illustrated in FIG. 7A, and heat is then applied, to cause shrinkage around the rim.

Figure 8:
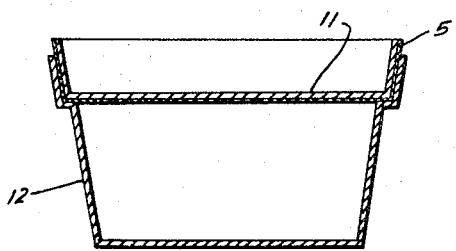
FIGS. 8 and 8A show a similar type of 2-part closure before and after crimping to the container is accomplished.
Figure 8A:
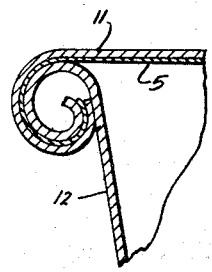

FIGS. 8 and 8A depict a straight edge container 12 having an inside plastic cover 5 and a recessed closure 11 applied over the top of the inside cover, before and after, respectively, the rolling, beading or crimping and heat sealing operation.

FIG. 9 shows the container 9, in which only a 1-part closure or transparent plastic cover 5 is applied to the container, and secured thereto is an opening string 13. This type closure is ideally suited in a circular container for bakery goods, such as, cakes, and pastries, or in a rectangular package for food products.

FIG. 10 shows a plastic sheet 5 secured to container 9 with additional sealing cement, wax, or other bonding media 14 at various spots, or completely around the edge of the closure or the container. Obviously, the opening means of FIG. 9 could be applied to the closure of FIG. 10 or any other figures with or without the outside cover, and likewise, the sealing cement 14 of FIG. 10 could be applied to the other constructions.

FIGS. 11, 11A, 12, 13 and 18 illustrate the dies which can be used in making the cover and the heads in sealing the container as set forth in applicant's invention.

Figure 11:
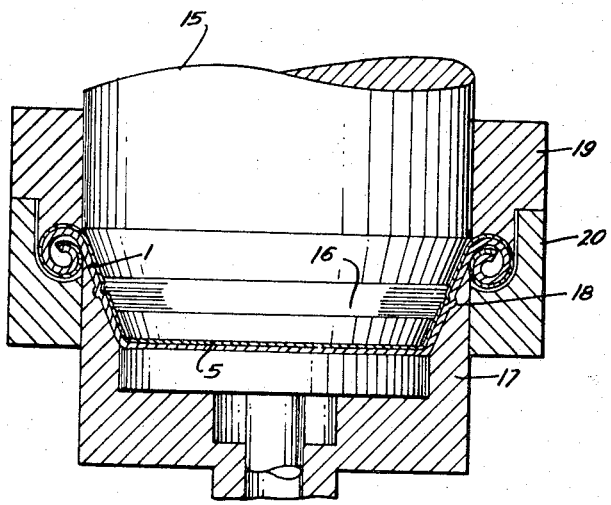
FIG. 11 illustrates a forming apparatus with curling rings, a 2 piece male die having a resilient ring in it (which may be omitted), to form a peripheral crease or indentation in the sidewall of the closure, and a female die having a peripheral groove for providing said indentation.

FIG. 11 shows a male die 15 (illustrated in greater detail in FIG. 18) having a resilient ring 16 therein. Female die 17 has a groove 18 opposite the resilient ring 16 in the male die. Upon pressure being applied by the male or forcing die, the closure being formed is forced into the groove by means of the elasticity of the resilient material to form the crease. At the same time, curling rings 19 and 20 form the rim of the cover. The resilient ring 16 may be omitted if desired, but then a less pronounced crease will be formed.

Figure 18:
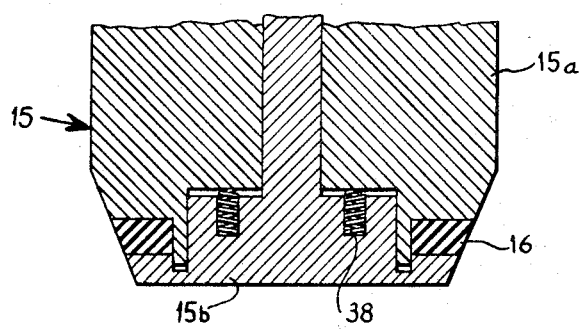
FIG. 18 shows the details of the male die of FIG. 11.

FIG. 18 illustrates the details of the male forming die 15, which comprises a pressure member 15A and a head member 15B, normally separated by springs 38. In operation springs are compressed and since the resilient member 16 is restrained on 3 sides, it is forced outwardly against the female die in the general area of the groove of the female die, forming therefor the peripheral crease in the side wall of the closure.

The 2-part closure of FIG. 11, for instance, is then picked up by the suction in the capping and sealing tool 21 (FIG. 11A) which has a suction line 22 therein, and as the container 9 is snapped beneath the formed cap, or vice versa, heat is applied to the rim of the closure through apertures 23A. The heat may be applied by hot air, hot water, steam, electricity, or even by an open flame. The application of heat will cause the oriented plastic film to shrink around the rim of the container and therefore form a tight, leakproof seal. Tools 21 and 23 are made of asbestos, hard rubber, etc. in their entirety or at least surrounding the heat passageways.

Figure 12:
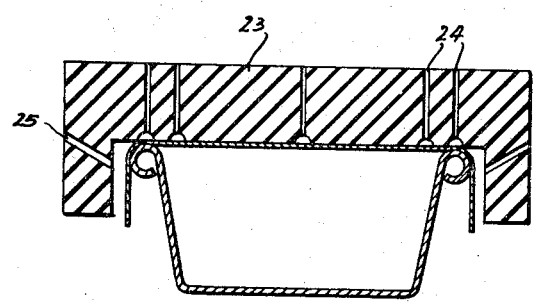
FIG. 12 shows a sealing head which carries the shrinkable film and seals it to the receptacle.

FIG. 12 shows a different type of suction sealing disc 23 having suction lines and positioning lines 24 in it. While FIG. 12 shows only a shrinkable film being placed over the receptacle and sealed by means of hot air or steam passing through apertures 25 simultaneously or separately, it is clear that a 2-part closure could be just as easily used. Hot air could be applied through the apertures at the side first and then through the aperture at the top, or in certain cases be applied at the side and at the top simultaneously. Obviously, any number of spacing of the holes could be used around the side and on the top.

FIG. 13 shows a different type of crimping and sealing device 26 having hot air apertures 27 therein and a holddown plate 28.

FIG. 14 illustrates my invention with a different type closure having a body portion 30 with an opening 31 in the center by means of which the contents of the container may be seen through the plastic inner cover 5.

Figure 11A:
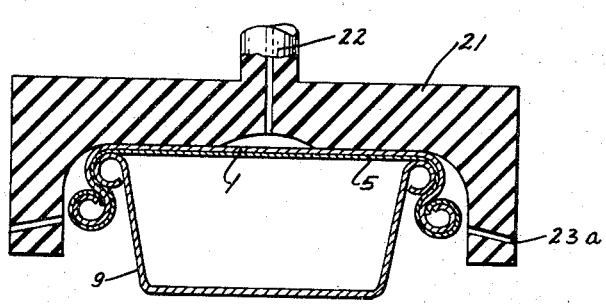
FIG. 11a shows a capping and sealing tool for snapping the cover over a receptacle and retaining it while heat is applied to seal the inner cover.

FIG. 15 shows a roll 36 of outer protective material 35, and a roll 34 of inner transparent shrinkable film 33, both of which are positioned over a straight, non-beaded, circular or rectangular container 32. A shears 37 cuts both layers of the material in cooperation with a heat sealing and crimping device; for example, as shown in FIG. 11A. The shears may be combined with the heat sealing and crimping device if desired so as to provide a one-motion operation for sealing a container from basic sheet material. Similarly, the two components of the closure may be fed from one roll, having been re-rolled into the single roll in a prior operation.

FIG. 16 shows a plastic film 39 having a cross type reinforcing and stiffening member 40 secured to it. The member may be a narrow rib in one or both directions, i.e., cross, a ring or any shape of paper, cardboard, plastic, etc. As the plastic film is contracting, the thin walls of the container 41 will move inwardly until the stiffening member is abutted. The stiffening member (or members if two or more separate pieces are desired) obviously must be below the rim of the container in this type construction and is particularly useful in long sided rectangular containers. Nevertheless, in any container a thinner gage material may be used and savings effected.

FIG. 17 illustrates a modification of FIG. 16 but in this modification the reinforcement member 43 only protects the plastic seal 42 and does not stiffen the container 44 since the stiffening rib, cross, ring (with or without a viewing center) etc. rests on the rim of the container. This type construction could also be used to pull a two-ply moldable material around the rim of a container or bottle and thereby produce a two-ply crimped cover for the bottle and at the same time provide an outer sealing member.

It is therefore clearly apparent that I have invented a sanitary cover, which will decrease the quantity of, for example, aluminum, to pack a certain amount of goods. This is true, because in the ordinary inside friction closure, sealed on an inwardly extending rib from the top, approximately 8% of the normal capacity of the container is wasted. With this flexible transparent film across the very top, the entire container may be utilized. This is particularly so in aluminum packaging, which is becoming so common today. Also connected with this sanitary feature is the sales appeal of transparent closures, in which the public demands to see what they are purchasing, especially in the food field.

It is also apparent that I have invented a closure which creates a seal that permits a wider degree of crushing or deformation of the container or its rim than heretofore permissible with other closures. This is evidenced by the fact that a crushing action on the container-closure system could be accompanied by a corresponding contraction in the film due to inherent tension, which tends to reduce the size of the film at any and all times, such action being without damage to the seal. Also apparent is the fact that deforming forces upon the film may occur without changes to the seal even though they may damage the outer layer of the two-ply closure. This is because, in a two-ply closure, as per FIG. 1, the inner film ply is free to move independently of the outer ply, since the only point of physical attachment is at the rim areas of the closure. Similarly, in a closure as in FIG. 3, where there is no rolled edge, the seal is not damaged by deformation.

This tolerance of the closure, to retain its effectiveness, despite abuse which causes deformation of the container and the cover, and changes in pressure due to changes in temperature of the food or other contents, or to atmospheric changes in pressure due to means of shipments (air transportation; use by military forces in tropics or Antarctic; etc.) is very important. For example, food may be steamed and cooked (or frozen) and then packaged in the container and the closure immediately applied, or food at room temperatures could be packed and then steamed and the container sealed. Because of the built-in tension, elasticity, and flexibility of the cover over a wide range of pressure changes, the cover will remain sealed.

My invention may be used either as a 1-stage or a 2-stage operation. In other words, the transparent film may be used alone or the outside cover may be used alone, or if the combination closure is used, the inside cover may be first applied and then the outside cover applied later, or, in a more practical way, the two covers may be formed together and applied as a laminated unitary closure.

FIG. 19 is the same as FIG. 13, but illustrates only a single-ply plastic cover instead of a two-ply cover. Either the container or the heat outlet may be moved relative to each other as by rotation or otherwise. The container, with or without support 45 and shaft 46 may be raised and lowered or rotated mechanically or even by hand. The only requirement is that heat be applied to the entire edges of the plastic cover and that the edge be moved relative to the heat gun or other source of heat. Hence, holding the container and rotating it manually produces the same effect. Obviously, the heat gun itself could be mounted either on a rotating support or on a vertical reciprocating support.

FIG. 20 shows a single roll of plastic material as in FIG. 15. In addition, if desired, a steel roll 47 with a single piercing point 48 may be incorporated somewhere along the web line in order to perforate the plastic cover 5', as shown at 49. The single perforation is to provide a vent to permit the escape of steam when items, such as, hot coffee, are packaged.

A second roll similar to 47 but with perforation entirely across the width of the web for easy severability of the individual covers could be substituted for the cutting knife 37. Obviously, the roll of plastic 34 might alternatively be so made and eliminate this operation during the closing process. Whether the web is perforated and torn off, or cut by knife 37, the square individual cover blanks when applied to circular container 32 will have enlarged bunched up corners providing an easy tear-off tab for removing and reapplying the elastic cover.

The single roll 34 may comprise a lamination of two types of plastic film, a single type of plastic or aluminum foil, or a lamination of plastic and aluminum foil. If the two rolls of web are used as illustrated in FIG. 15, a roll similar to 47 could be applied to the upper web, spacing apart the openings in the two-part closure so that there would be no seepage through the non-aligned openings.

FIGS. 21, 21A, 22, and 23 illustrate additional types of sealing heads similar to FIGS. 11A and 12. These sealing heads may be flat and the heated fluid directed downwardly around the container rim, but a recessed cavity with side openings performs better. Also, as the cover is withdrawn secondary heat then flows better over the central closure area utilizing my selective shrinkage concept. These sealing tools 50, 55, and 57 are made of non-heat-conducting material, such as, asbestos, hard rubber, etc., as mentioned on page 18 in connection with FIGS. 11A and 12.

As mentioned previously, FIG. 21 shows a sealing tool 50 having a central descending hot air or steam passageway 51 and orifices 52 circumferentially spaced around the sealing tool. When container 9 is placed on a reciprocating support 45' attached to rod 46' and is raised into cavity 54 in the tool, the edges of the plastic cover 53 will either lie against the side of the cavity or be adjacent thereto so that the hot air will seal the closure. Obviously, a sponge rubber or other resilient diaphragm having downwardly turned edges to follow the contour of the cavity could be used if desirable for holding or smoothing out the limp film.

FIG. 21A is a section similar to FIG. 21, but showing a thinner gauge film 5 which loosely drapes within the cavity without touching or substantially without touching the sides of the cavity. Whether the unformed film drapes freely in the cavity depends largely upon the gauge or thickness of the film. For example, if 20 gauge film (.0002 in. thick) is used it is more apt to drape in a vertical direction (as in FIGS. 3 to 7, 9, 10, 12, and 19) than if a heavier gauge, such as, 80 gauge film (.0008 in.) or 1.5 mil sheet (.0015) is used.

FIG. 22 shows a sealing tool 55 having a cavity 56 therein. In this modified form, instead of a central vertical passageway there is a series of independent, substantially vertical hot air passageways. The space between the passageway openings could be connected by a semi-circular channel for better distribution of the hot fluid heat.

FIG. 23 shows a further modified form of sealing tool 57 formed basically of two conical-shaped or frusto-conical-shaped elements, one positioned within the other. The outer inverted, cup-like element has positioned in it an inner cup-like element 58 of frusto-conical shape or pure cone-shaped to a point. These elements are similar in shape to the conventional Dixie cup and prototypes have been of two sizes of such cups. Across the bottom of cone-shaped element 58 is cover 59, against which is placed a resilient foam rubber pad which serves to insulate and to retain the plastic cover. A flat spring can easily be provided between cover 59 and pad 60 if more resiliency were desirable. Openings 61 are provided which lead from the passageways to the plastic film. The source of heat may be directed by any commercial hot air or steam blower.

FIGS. 24–27 show different types of sealing apparatuses. FIG. 24 shows a vertical reciprocating platform 45' operated by handle 66 pivoted in sealing apparatus 65. A cross arm 64 supports a stationary housing 69 for an electrical heating element 68 (obviously, the housing could be designed to move and the container remain stationary). As the handle is lifted, the restraining or holding plate 62 (through the illustrated pivot or rack and pinion, etc.) rises above the housing 69 so that the fluid or convection current heat from the electrical heating wires will cause the plastic film 5 to shrink, thicken and to seal itself against the container. Cup-shaped (or flat) shielding plate 62 of asbestos preferably (or metal) by a spring 63 (or gravity alone) restrains the cover when heat is applied first and primarily to the rim area.

Alternatively, as shown in phantom, if desired the housing 69' could be positioned beneath the cover so that actual contact would be made between the circumferentially positioned electrical wire 68' and the cover 5 thereby forming an enlarged elastic bead at the edge thereof. Switch 67 regulates the current to heating element 68 (or 68').

FIG. 26 is a modified form of floating sealing head 75 supported through a rod 74 to a pivoting arm 70. Spring 73 tends to keep the sealing head extended but permits limited resilient movement. The arm is pivoted to support 72 by pin 71. Sealing head 75 is equipped with a heat conducting plate 76, foam rubber pad 77, and an electrical heating element 78. Electrical switch 67' permits current to flow through the coil 78.

FIG. 27 is a further modified form of sealing element in which a sponge rubber insulating shield 28' restrains the upper portion of the plastic film. Heating element 79, which can be a commercial sickroom inhalator, comprises a container or glass jar 80 with a nozzle cover 81 and having an electrical heating coil 82 positioned in the liquid. As either the inhalator or the cover are moved relative to each other, the container is sealed.

It should be noted that in all of the sealing tools, such as illustrated in FIGS. 11A, 12, 15, 19, 21 to 27, and other modifications described in the specification, that preferably the rim area of the cover is shrunken first, and as the cover is being withdrawn from its optimum, i.e., final position, the residual, secondary heat flows over the top of the plastic cover and shrinks that portion of the cover to make a plane, neat, tight cover. This is selective shrinkage as caused by selective heating.

My invention is particularly applicable when using heat shrinkable films that are normally less than .002" thick and capable of large shrinkage in all directions parallel to the film surfaces. Actually films in the range of .0002" (20 gauge) to .0008" (80 gauge) are generally satisfactory and may be used. The thickness of the film, of course, will depend somewhat upon the area to be covered. However, it is within the scope of my invention to use any type film that is shrinkable in only one direction as well as in two directions (e.g. an oriented film of the so-called tensilized or cross-tensilized type) which could be used on containers of particular form, such as on a rectangular container.

Typical examples of certain films which could be used are oriented films of rubber hydrochloride (oriented "Pliofilm," such as "Snug-Pak") or of vinylidene chloride (oriented "Saran," "Cryovac," biaxially oriented irradiated polyethylene, biaxially oriented irradiated polypropylene, heat shrinkable nylon, heat shrinkable Mylar, etc.), which are heat shrinkage by reason of their oriented internal structure commonly induced by stretching the same unidirectionally or multidirectionally while heated or supercooled. Obviously, the "orienting" of such films may be done by mechanical, pneumatic, or other physical methods of expanding or stretching the films, or by chemical or other means of realigning the molecular arrangement.

By way of example, the best degree of seal, especially on containers with circularly shaped mouths, may be assured through the use of internally oriented plastic films capable of linear shrinkage of 50% in all directions parallel to the film surfaces upon heating to temperatures between 160° and 220° F. One type of such material is standard "Snug-Pak" of 40, 50 and 60 gauge, sold by Tee-Pak, Inc., which is stretched to twice its width and to twice its length whereby to quadruple the area and to subsequently shrink down to ¼ of the original stretched area. "Pliofilm" made by Goodyear Tire & Rubber Company, for example, may be stretched appreciably more or appreciably less and consequently will be capable of shrinking more or less than standard "Snug-Pak." These percentages of shrinkage and temperature are by way of illustration only and may be varied within wide limits. Obviously, the shrinkage temperature will vary for different heat shrinkable films. Also, in all or practically all of the oriented films, the shrinkage action will take place instantaneously or almost instantaneously.

Films possessing the above mentioned overall shrinkage properties are desirable in order to produce adequate tightness of seal at the rim of the container where the greatest degree of utilization of the shrinkage property is required locally. It is to be understood, however, that the shrinkage values do not represent the overall reduction in size of the entire film in the closure after heat application, nor the actual shrinkage in producing the seal.

The selection of films of suitable shrinkability, suitable shrinkage temperature and suitable strength will be dictated primarily by the nature of the container or contents and the temperature to which the local area may be heated where seal of closure to container is effected, and such selection may be readily made. For example, where frozen items are being sealed in an oven and the blasts of heated air are coming in an upward direction from near the bottom of the oven or the bottom of the container, the container itself and the frozen food or frozen zone proects or tends to protect or shield the central area of the plastic cover and leave only the edges exposed to the ambient fluid heat or convection current heat and thereby alone (without any mechanical preforming) simultaneously form the closure and at the same identical time seal the container.

While I have referred to the film as being transparent since that quality would be most desirable in the food packaging field, it is of course understood that a cloudy, opaque, or colored film might be used, and that the color could be included throughout the body of the film or applied to either side. Also, the film might be a single film or a laminated film of two plies of plastics or of different material; the principal requirement to accomplish my invention being that at least one of the plies of the film be heat shrinkable and that this ply control the action of the laminated film.

The concept of selective shrinkage of shrinkable film may be defined as the controlled reduction in size of portions of said film to a substantial degree while holding the reduction in size of the balance of the film to a lesser degree or to none at all. This concept applies in the closures herein described through sufficient shrinkage of the film at the rim of the containers to lock and to provide a seal at the mouth of the container while controlling the shrinkage across the mouth of the container through the retention of the film at the rim, by shielding, by omitting the shrinkage medium over this area, or by any other means.

The shielding of the plastic film (with or without the retention or restraining thereof) may be accomplished by a heat insulating flat or recessed plate, upstanding hood, or even by the outer cover itself if a two-ply or two-part cover is used. An upstanding shielding hood or band may be desirable when the contents of the container are appreciably higher than the top of the container.

When a slightly heavier gauge film is used which will not normally drape by its own weight, the outside closure may force the edge of the film downwardly alongside of or adjacent to the wall of the container. In addition, when fluid heat is applied to the film, the container itself acts as an on the spot or in situ mold to control the shrinkage of the film and to determine the final shape of the cover. This is due to the fact that the cover being formed surrounds and assumes the contour of the container being covered and sealed.

It is therefore seen that there has been provided a leakproof and moisture proof closure, which is easy to manufacture and is inexpensive since no preliminary molding or performing is necessary. While the invention is particularly adapted for outside aluminum covers and containers of aluminum, the invention is equally effective for paper, plastic, steel, other metals or materials, etc. Also, while frequent reference is made to container covers, the same considerations hold true for any covers having a similar shape irrespective of whether used for replaceable dust caps, shower caps, swim caps, covers for refrigerator dishes, etc.

Any of the features shown in one modification may be used in any of the other modifications or combinations illustrated or described. As an example, the sealing means of wax, cement, thermoplastic material, etc. 14, shown in FIG. 10, could be used in FIGS. 16 and 17; an outer protective cover 6, shown in FIG. 4, could be used in FIGS. 16 and 17, cone shaped heating elements, 55 and 57, could be provided with a central hot air or steam passageway similar to heating element 50 and vice versa; the steam jet 79 could be replaced by a hot air jet 27 or an electrical contact wire 68' or heating wire 68; the rotating platform 45 could be replaced by vertical movable platforms 45' for either the container or the heating medium; rod 74 could be anchored and spiral spring 73 replaced by a flat spring between sealing head 75 and heat conducting plate 76 or substituted entirely for plate 76; and the foam rubber or asbestos pad or diaphragm 77 could be made circular with downturned edges and be placed in the sealing tool cavity 54 of FIG. 21 to assume the configuration of the upper portion of the cavity. These are mere mechanical changes readily apparent to a mechanic skilled in the art and all within the scope of my invention.

Other modifications of the principal items of this invention are clearly apparent, and I do not desire to be limited in my invention except as set forth in the claims.

What is claimed is:

1. A device for applying a closure to a container comprising a head for holding the closure and applying the closure to the container, heat applying means provided in said head, and a suction aperture through the head of said device whereby said closure may be held in position until a container is snapped into the closure with heat applied to the edges of said closure whereby the container will be sealed.

2. The method of making a closure to be used for capping and sealing a flexible metal container comprising the steps of forcing a moldable material into a female die by a male die, simultaneously forming a peripheral crease in the closure flange about midway of its height by pressing a resilient ring on said male member into a groove in said female member, also simultaneously forming a beaded edge on the rim of said closure, and subsequently snapping the beaded edge of the closure over the mouth of a container.

3. A forming head for forming a closure of heat shrinkable material on a container comprising a lower surface defining an opening having a peripheral outline generally corresponding to the peripheral outline of the container on which the closure is to be formed, a transverse side wall surface intersecting said lower surface and extending into said head and further defining said opening, an upper surface formed in said head and intersecting said transverse side wall surface and extending generally parallel to the top of the closure being formed and further defining said opening, and heating means provided along said side wall surface between said lower surface and said upper surface, said heating means comprising a plurality of fluid ports spaced about the side wall surface and directed inwardly through the side wall surface toward the center of said opening.

4. A forming head for forming a closure of heat shrinkable material on a container comprising a lower surface defining an opening having a peripheral outline generally corresponding to the peripheral outline of the container on which the closure is to be formed, a transverse side wall surface intersecting said lower surface and extending into said head and further defining said opening, an upper surface formed in said head and intersecting said transverse side wall surface and extending generally parallel to the top of the closure being formed and further defining said opening, and heating means provided along said side wall surface between said lower surface and said upper surface, said heating means comprising a plurality of fluid orifices in the side wall surface and spaced about said opening.

5. A forming head for forming a closure of heat shrinkable material on a container comprising a lower surface defining an opening having a peripheral outline generally corresponding to the peripheral outline of the container on which the closure is to be formed, a transverse side wall surface intersecting said lower surface and extending into said head and further defining said opening, an upper surface formed in said head and intersecting said transverse side wall surface and extending generally parallel to the top of the closure being formed and further defining said opening, and heating means provided along said side wall surface between said lower surface and said upper surface, and suction means in said head and connected to said opening through said upper surface.

References Cited
UNITED STATES PATENTS

| 2,732,116 | 1/1956 | Merrill | 53—42 |
| 3,014,320 | 12/1961 | Harrison | 53—42 |
| 2,447,855 | 8/1948 | Goodwin et al. | 93—1.3 |
| 2,595,046 | 4/1952 | Amberg | 93—1.3 |
| 2,707,588 | 5/1955 | Amberg | 229—43 |
| 2,746,669 | 5/1956 | Moore | 229—43 |
| 2,141,833 | 12/1938 | Young | 53—42 X |
| 2,976,655 | 3/1961 | Dreyfus et al. | 53—42 |
| 2,423,237 | 7/1947 | Halacher | 53—373 X |
| 2,608,334 | 8/1952 | Knocke | 53—42 X |
| 2,885,105 | 5/1959 | Heyl et al. | 53—42 X |
| 3,034,271 | 5/1962 | Carpenter et al. | 53—329 |

TRAVIS S. McGEHEE, *Primary Examiner.*

GRANVILLE Y. CUSTER, FRANK E. BAILEY, ROBERT A. LEIGHY, ROBERT E. PULFOY,
*Examiners.*